United States Patent [19]
Depledge et al.

[11] Patent Number: 5,884,307
[45] Date of Patent: Mar. 16, 1999

[54] UPDATING BITMAPPED INDEXES

[75] Inventors: Michael Depledge, San Jose; Hakan Jakobsson, San Francisco; Cetin Ozbutun, San Carlos; Jeffrey I. Cohen, Sunnyvale, all of Calif.

[73] Assignee: Oracle Corporation, Redwood Shores, Calif.

[21] Appl. No.: 808,585

[22] Filed: Feb. 28, 1997

[51] Int. Cl.[6] .................................................. G06F 17/30
[52] U.S. Cl. .................... 707/7; 707/1; 707/3; 707/5; 707/10; 707/100; 707/102
[58] Field of Search ................................. 707/1, 3, 100, 707/102, 5, 7

[56] References Cited

U.S. PATENT DOCUMENTS

| | | | |
|---|---|---|---|
| 5,283,894 | 2/1994 | Deran | 707/3 |
| 5,495,608 | 2/1996 | Antoshenkov | 707/10 |
| 5,560,007 | 9/1996 | Thai | 707/3 |
| 5,619,226 | 4/1997 | Cahill, III | 345/132 |
| 5,649,181 | 7/1997 | French et al. | 707/3 |
| 5,666,528 | 9/1997 | Thai | 707/3 |
| 5,682,179 | 10/1997 | Cahill, III | 345/127 |
| 5,694,149 | 12/1997 | Cahill, III | 345/127 |

OTHER PUBLICATIONS

"SQL *TextRetrieval Administrator' Guide", Version 2.0, Oracle Corporation, Rev. Jul. 1992 (Part No. 0365–20–0792).

Patrick O'Neil and Goetz Graefe, "Multi–Table Joins Through Bitmapped Join Indices", SIGMOD Record, vol. 24, No. 23, Sep. 1995.

IOUW wrap-up (vendors introduce database tools at International Oracle Users Week conference) (Client/server Connection) (Industry Trend or Event) DBMS, v8 n13, p112(1), Dec. 1995.

Consolidated Automated Support System (CASS), Automated Technical Information (ATI), Display System Using ASCII Data Files, Kenneth W. Ludwick, Naval Aviation Depot Norfolk, Norfolk, Virginia 1994.

"Oracle TextServer3 Concepts, Version 3," Oracle Corporation (Part No. A24984–1, 1995, pp. 3–1 to 3–23).

"Oracle Textserver3 Concepts, Release 3.1," Oracle Corporation (Part No. A41697–2), 1996, pp. 3–1 to 3–29).

*Primary Examiner*—Wayne Amsbury
*Assistant Examiner*—Shahid Alam
*Attorney, Agent, or Firm*—McDermott, Will & Emery

[57] ABSTRACT

A method and apparatus for updating a segmented bitmapped index to reflect a change made to data upon which the segmented index is based. Change records specifying changes to bitmap segments contained in the segmented bitmapped index are sorted by key value (bitmap segment) and row ID (bit) before being applied to the segmented bitmapped index. When the change records are being applied to the bitmap segment contained in the segmented bitmapped index, the index entry containing the bitmap segment to be updated is locked. If a new bitmap segment must be generated, the index entry covering a row in the data having a row ID less than the row ID of the change is first locked. Then a new index entry is generated, stored in the segmented bitmapped index, and the locked index entry unlocked. If the segmented bitmapped index does not contain an index entry covering a row in the data having a row ID less than the row ID of the change, then a dummy index entry is generated, stored in the segmented bitmapped index, and locked. A new index entry is then generated and stored in the segmented bitmapped index, after which the dummy index entry is unlocked and deleted.

21 Claims, 9 Drawing Sheets

FIG. 3  CUSTOMER DATA TABLE -- 300

| NAME | LOCATION | TYPE | DISCOUNT |
|---|---|---|---|
| ABLE | EAST | BUSINESS | NONE |
| BAKER | NORTH | INDIVIDUAL | STANDARD |
| CHARLIE | EAST | BUSINESS | STANDARD |
| ECHO | EAST | BUSINESS | STANDARD |
| FOXTROT | SOUTH | BUSINESS | STANDARD |
| OSCAR | NORTH | INDIVIDUAL | STANDARD |
| SIERRA | EAST | BUSINESS | NONE |
| TANGO | SOUTH | INDIVIDUAL | SPECIAL |
| ZEBRA | WEST | INDIVIDUAL | NONE |

FIG. 4  SEGMENTED BITMAPPED INDEX FOR THE DATA TYPE 'LOCATION' -- 400

| KEY | SRID | ERID | BITMAP SEGMENT |
|---|---|---|---|
| EAST | 1 | 3 | 1 0 1 |
| EAST | 4 | 6 | 1 0 0 |
| EAST | 7 | 9 | 1 0 0 |
| NORTH | 1 | 3 | 0 1 0 |
| NORTH | 4 | 6 | 0 0 1 |
| NORTH | 7 | 9 | 0 0 0 |
| SOUTH | 1 | 3 | 0 0 0 |
| SOUTH | 4 | 6 | 0 1 0 |
| SOUTH | 7 | 9 | 0 1 0 |
| WEST | 1 | 3 | 0 0 0 |
| WEST | 4 | 6 | 0 0 0 |
| WEST | 7 | 9 | 0 0 1 |

FIG. 5

SEGMENTED BITMAPPED INDEX FOR THE DATA TYPE 'TYPE' -- 500

| KEY | SRID | ERID | BITMAP SEGMENT |
|---|---|---|---|
| BUSINESS | 1 | 3 | 1 0 1 |
| BUSINESS | 4 | 6 | 1 1 0 |
| BUSINESS | 7 | 9 | 1 0 0 |
| INDIVIDUAL | 1 | 3 | 0 1 0 |
| INDIVIDUAL | 4 | 6 | 0 0 1 |
| INDIVIDUAL | 7 | 9 | 0 1 1 |

502 brackets all rows.

FIG. 6

SEGMENTED BITMAPPED INDEX FOR THE DATA TYPE 'DISCOUNT' -- 600

| KEY | SRID | ERID | BITMAP SEGMENT |
|---|---|---|---|
| NONE | 1 | 3 | 1 0 0 ← 604 |
| NONE | 4 | 6 | 0 0 0 |
| NONE | 7 | 9 | 1 0 1 |
| SPECIAL | 1 | 3 | 0 0 0 |
| SPECIAL | 4 | 6 | 0 0 0 |
| SPECIAL | 7 | 9 | 0 1 0 |
| STANDARD | 1 | 3 | 0 1 1 |
| STANDARD | 4 | 6 | 1 1 1 |
| STANDARD | 7 | 9 | 0 0 0 |

606 → first row; 602 brackets all rows.

FIG. 7

UNSORTED RESULTS OF QUERY
"SET DISCOUNT = 'SPECIAL' WHERE LOCATION = 'EAST'
AND TYPE = 'BUSINESS' " -- 700

| KEY VALUE | ROW ID |
|---|---|
| NONE | 3 |
| SPECIAL | 3 |
| STANDARD | 4 |
| SPECIAL | 4 |
| STANDARD | 7 |
| SPECIAL | 7 |
| NONE | 1 |
| SPECIAL | 1 |

704 → (first row)
706 → (rows 2-6), 702 (all rows)
708 → (last two rows)

FIG. 8

SORTED RESULTS OF QUERY
"SET DISCOUNT = 'SPECIAL' WHERE LOCATION = 'EAST'
AND TYPE = 'BUSINESS' " -- 800

| KEY VALUE | ROW ID |
|---|---|
| NONE | 1 |
| NONE | 3 |
| SPECIAL | 1 |
| SPECIAL | 3 |
| SPECIAL | 4 |
| SPECIAL | 7 |
| STANDARD | 4 |
| STANDARD | 7 |

708 → (first row)
704 → (second row)
702 (all rows)

FIG. 9

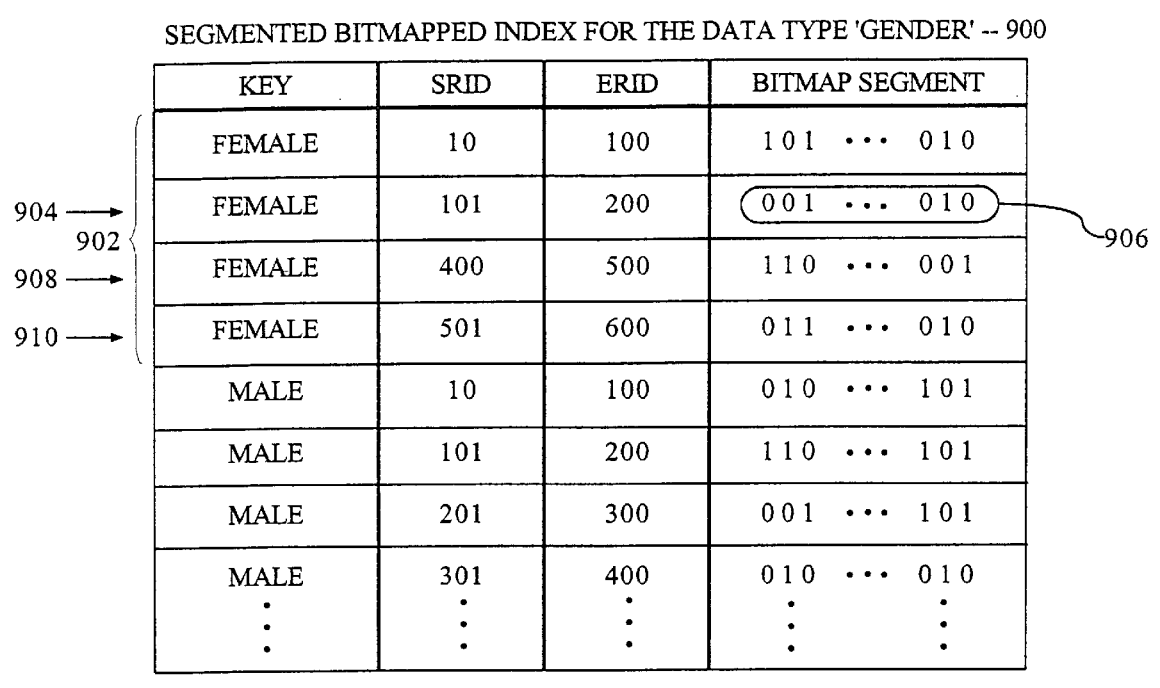

SEGMENTED BITMAPPED INDEX FOR THE DATA TYPE 'GENDER' -- 900

| KEY | SRID | ERID | BITMAP SEGMENT |
|---|---|---|---|
| FEMALE | 10 | 100 | 1 0 1 ⋯ 0 1 0 |
| FEMALE | 101 | 200 | 0 0 1 ⋯ 0 1 0 |
| FEMALE | 400 | 500 | 1 1 0 ⋯ 0 0 1 |
| FEMALE | 501 | 600 | 0 1 1 ⋯ 0 1 0 |
| MALE | 10 | 100 | 0 1 0 ⋯ 1 0 1 |
| MALE | 101 | 200 | 1 1 0 ⋯ 1 0 1 |
| MALE | 201 | 300 | 0 0 1 ⋯ 1 0 1 |
| MALE | 301 | 400 | 0 1 0 ⋯ 0 1 0 |

UPDATING BITMAPPED INDEXES

RELATED APPLICATIONS

The present application is related to: U.S. patent application Ser. No. 08/807,344, entitled "CREATING BITMAPS FROM MULTI-LEVEL IDENTIFIERS" now pending, filed by Cetin Ozbutun, Michael Depledge, Hakan Jakobsson, Mark Kremer, Jeffrey I. Cohen, Quoc Tai Tran, and Alexander C. Ho on the equal day herewith, (attorney docket no. 3018-032) the contents of which are incorporated herein by reference.

U.S. patent application Ser. No. 08/808,584, entitled "BITMAP SEGMENTATION" now pending, filed by Cetin Ozbutun, Jeffrey I. Cohen, Hakan Jakobsson, Mark Kremer, Michael Depledge, Quoc Tai Tran, Alexander C. Ho, and Julian Hyde, on the equal day herewith, (attorney docket no. 3018-034) the contents of which are incorporated herein by reference.

U.S. patent application Ser. No. 08/752,128, entitled "METHOD AND APPARATUS FOR PROCESSING COUNT STATEMENTS IN A DATABASE SYSTEM" U.S. Pat. No. 5,819,256, filed by Cetin Ozbutan, Michael Depledge, Hakan Jakobsson, and Jeffrey I. Cohen, on Nov. 20, 1996, (attorney docket no. 3018-033) the contents of which are incorporated herein by reference.

U.S. patent application Ser. No. 08/808,097, entitled "GROUP BY AND DISTINCT SORT ELIMINATION USING COST-BASED OPTIMIZATION" U.S. Pat. No. 5,822,748, filed by Jeffrey Ira Cohen, Cetin Ozbutun, Michael Depledge, and Hakan Jakobsson, on the equal day herewith, (attorney docket no. 3018-035) the contents of which are incorporated herein by reference.

U.S. patent application Ser. No. 08/808,096, entitled "METHOD AND APPARATUS FOR USING INCOMPATIBLE TYPES OF INDEXES TO PROCESS A SINGLE QUERY" now pending, filed by Jeffrey Ira Cohen, Cetin Ozbutun, Hakan Jakobsson, and Michael Depledge, on the equal day herewith, (attorney docket no. 3018-036) the contents of which are incorporated herein by reference.

U.S. patent application Ser. No. 08/808,094, entitled "INDEX SELECTION FOR AN INDEX ACCESS PATH" now pending, filed by Hakan Jakobsson, Michael Depledge, Cetin Ozbutun, and Jeffrey I. Cohen, on the equal day herewith, (attorney docket no. 3018-037) the contents of which are incorporated herein by reference.

U.S. patent application Ser. No. 08/807,429, entitled "QUERY PROCESSING USING COMPRESSED BITMAPS" now pending, filed by Cetin Ozbutun, Jeffry I. Cohen, Michael Depledge, Julian Hyde, Hakan Jakobsson, Mark Kremer, and Quoc Tai Tran, on the equal day herewith, (attorney docket no. 3018-039) the contents of which are incorporated herein by reference.

U.S. patent application Ser. No. 08/807,451, entitled "BITMAPPED INDEXING WITH HIGH GRANULARITY LOCKING" now pending, filed by Michael Depledge, Jeffrey I. Cohen, Hakan Jakobsson, Mark Kremer, Cetin Ozbutun, Quoc Tai Tran, and Alexander C. Ho, on the equal day herewith, (attorney docket no. 3018-040) the contents of which are incorporated herein by reference.

U.S. patent application No. 08/808,560, entitled "BITMAP INDEX COMPRESSION" now pending, filed by Jeffrey I. Cohen, Michael Depledge, Hakan Jakobsson, Mark Kremer, Cetin Ozbutin, and Quoc Tai Tran, on the equal day herewith, (attorney docket no. 3018-042) the contents of which are incorporated herein by reference.

U.S. patent application Ser. No. 08/808,586, entitled "COMBINING BITMAPS WITHIN A MEMORY LIMIT" now pending, filed by Cetin Ozbutun, Jeffry I. Cohen, Michael Depledge, Julian Hyde, Hakan Jakobsson, Mark Kremer, and Quoc Tai Tran, on the equal day herewith, (attorney docket no. 3018-078) the contents of which are incorporated herein by reference.

FIELD OF THE INVENTION

The present invention relates to database systems, and more specifically, to a method and apparatus for updating bitmapped indexes.

BACKGROUND OF THE INVENTION

In the context of indexes, a bitmap is a series of bits associated with both a body of records and a particular criteria. Each bit in the bitmap corresponds to one of the records in the body of records and serves as a flag to indicate whether the corresponding record satisfies the criteria associated with the bitmap. Typically, a bitmapped index contains one bitmap for each unique value stored in a particular column of a table, with each bit of the bitmap indicating whether a corresponding row of the table contains the unique value in the particular column.

Bitmapped indexes are useful tools for processing database queries because they can increase query processing performance while requiring relatively little storage space. However, for bitmapped indexes to remain valid, they must always accurately reflect the data upon which the bitmapped indexes are based. This means that bitmapped indexes must be updated whenever a change is made to the data upon which the bitmapped indexes are based. For a small number of changes, updating the associated bitmapped indexes may not require significant system resources. For example, some types of database queries, such as individual inserts and deletes, only require a few database changes, which are easily reflected in a bitmapped index.

On the other hand, some types of database queries, such as bulk data manipulation language (DML) statements, generate a large number of database changes which must be reflected in all associated bitmapped indexes for those bitmapped indexes to remain valid. Updating each of the bitmapped indexes to reflect a large number of changes to data upon which the bitmapped indexes are based can require significant system resources. This is particularly true when the results of a database query are not related to the physical arrangement of the bitmapped index data on disk. As a result, all of the bitmap changes for a particular bitmap may not all be applied at once, requiring some bitmaps to be updated many times. Each time a bitmap is to be updated, the bitmap must be read into memory, updated and written to back disk. In addition, each bitmap update requires that a lock be obtained on the bitmapped index entry containing the bitmap to be updated before the change is applied and then that the lock is released after the change is applied.

In view of both the benefits provided by bitmapped indexes and the resources required to update bitmapped indexes to reflect a large number of changes to data upon which bitmapped indexes are based, a method and apparatus for updating bitmapped indexes to reflect a large number of changes made to the data upon which the bitmapped indexes are based which reduces the resources required to make the changes to the bitmapped indexes are highly desirable.

SUMMARY OF THE INVENTION

According to one aspect of the present invention, a method is provided for updating a bitmapped index to reflect a change made to data upon which the bitmapped index is based. First, a plurality of change records is sorted based upon a bitmap represented in the bitmapped index. The plurality of change records reflect the change made to the data and also correspond to the bitmap represented in the bitmapped index. Then, the sorted plurality of change records are applied in order to the bitmap represented in the bitmapped index.

According to another aspect of the present invention, a method is provided for updating a segmented bitmapped index to reflect a change made to data upon which the segmented bitmapped index is based. First, a plurality of change records specifying changes to bitmap segments contained in the segmented bitmapped index is received. Then, the plurality of change records is sorted based upon the order of the bitmap segments contained in the segmented bitmapped index. Finally, the sorted plurality of change records is applied in order to the bitmap segments contained in the segmented bitmapped index.

According to another aspect of the present invention, a computer system having a storage medium with a data table stored thereon is provided for updating a bitmapped index to reflect a change made to data upon which the bitmapped index is based. The data table includes a first set of data of a first type and a second set of data of a second type. The first set of data specifies a bitmap segment contained in a segmented bitmapped index to be updated. The second set of data specifies a change to the bitmap segment specified by the first set of data which, when applied to the bitmapped segment, causes the bitmapped index to reflect a change made to data upon which the bitmapped index is based.

BRIEF DESCRIPTION OF THE DRAWINGS

The present invention is illustrated by way of example, and not by way of limitation, in the figures of the accompanying drawings and in which like reference numerals refer to similar elements and in which:

FIG. 3 illustrates the index entries of a segmented bitmapped index for the data type LOCATION contained in the customer data table illustrated in FIG. 2;

FIG. 4 illustrates the index entries of a segmented bitmapped index for the data type TYPE contained in the customer data table illustrated in FIG. 2;

FIG. 5 illustrates the index entries of a segmented bitmapped index for the data type DISCOUNT contained in the customer data table illustrated in FIG. 2;

FIG. 6 illustrates the unsorted results for the query "SET DISCOUNT='SPECIAL' WHERE LOCATION='EAST' AND TYPE='BUSINESS'", performed on the customer data table illustrated in FIG. 2;

FIG. 7 illustrates the query results illustrated in FIG. 6 after being sorted by key value and row ID;

FIG. 8 is a flow chart illustrating a method for updating a bitmapped index to reflect changes made to data upon which he bitmapped index is based, according to an embodiment of the present invention;

FIG. 9 illustrates the index entries of a segmented bitmapped index for the data type GENDER.

DETAILED DESCRIPTION OF THE PREFERRED EMBODIMENT

A method and apparatus for updating a bitmapped index to reflect a large number of changes to data upon which the bitmapped is based is described. In the following description, for the purposes of explanation, numerous specific details are set forth in order to provide a thorough understanding of the present invention. It will be apparent, however, to a person of ordinary skill in the art that the present invention may be practiced without these specific details. In other instances, well-known structures and devices are illustrated shown in block diagram form in order to avoid unnecessarily obscuring the present invention.

Hardware Overview

Figure 1:
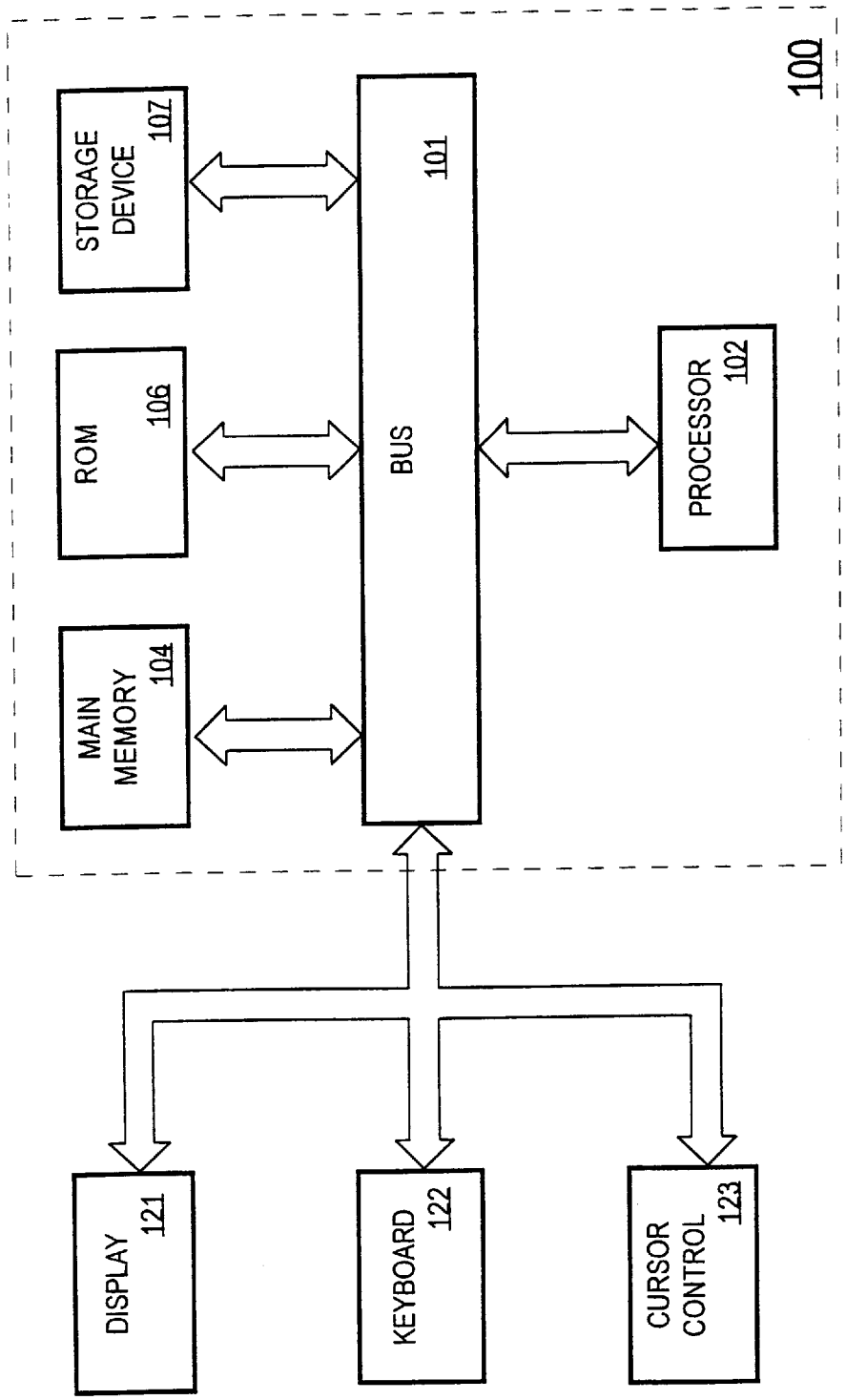
FIG. 1 is a block diagram of a computer system on which the present invention may be implemented.

FIG. 1 is a block diagram of a computer system 100 upon which an embodiment of the present invention may be implemented. Computer system 100 includes a bus 101 or other communication mechanism for communicating information, and a processor 102 coupled with bus 101 for processing information. Computer system 100 further comprises a random access memory (RAM) or other dynamic storage device 104 (referred to as main memory), coupled to bus 101 for storing information and instructions to be executed by processor 102. Main memory 104 also may be used for storing temporary variables or other intermediate information during execution of instructions by processor 102. Computer system 100 also includes a read only memory (ROM) and/or other static storage device 106 coupled to bus 101 for storing static information and instructions for processor 102. A data storage device 107, such as a magnetic disk or optical disk, is coupled to bus 101 for storing information and instructions.

Computer system 100 may also be coupled via bus 101 to a display device 121, such as a cathode ray tube (CRT), for displaying information to a computer user. An alphanumeric input device 122, including alphanumeric and other keys, is typically coupled to bus 101 for communicating information and command selections to processor 102. Another type of user input device is cursor control 123, such as a mouse, a trackball, or cursor direction keys for communicating direction information and command selections to processor 102 and for controlling cursor movement on display 121. This input device typically has two degrees of freedom in two axes, a first axis (e.g., x) and a second axis (e.g., y), which allows the device to specify positions in a plane.

Alternatively, other input devices such as a stylus or pen may be used to interact with the display. A displayed object on a computer screen may be selected by using a stylus or pen to touch the displayed object. The computer detects the selection by implementing a touch sensitive screen. Similarly, a light pen and a light sensitive screen may be used for selecting a displayed object. Such devices may thus detect selection position and the selection as a single operation instead of the "point and click," as in a system incorporating a mouse or trackball. Stylus and pen based input devices as well as touch and light sensitive screens are well known in the art. Such a system may also lack a keyboard such as 122 wherein all interface is provided via the stylus as a writing instrument (like a pen) and the written text is interpreted using optical character recognition (OCR) techniques.

The present invention is related to the use of computer system 100 to provide for the updating of a bitmapped index to reflect a large number of changes to data upon which the bitmapped index is based. According to one embodiment of the present invention, updating a bitmapped index to reflect a large number of changes to data upon which the bitmapped index is based is provided by computer system 100 in response to processor 102 executing sequences of instructions contained in memory 104. Such instructions may be read into memory 104 from another computer-readable medium, such as data storage device 107. Execution of the sequences of instructions contained in memory 104 causes processor 102 to perform the process steps that will be described hereafter. In alternative embodiments, hard-wired circuitry may be used in place of or in combination with software instructions to implement the present invention. Thus, embodiments of the present invention are not limited to any specific combination of hardware circuitry and software.

Functional Overview

Figure 2:
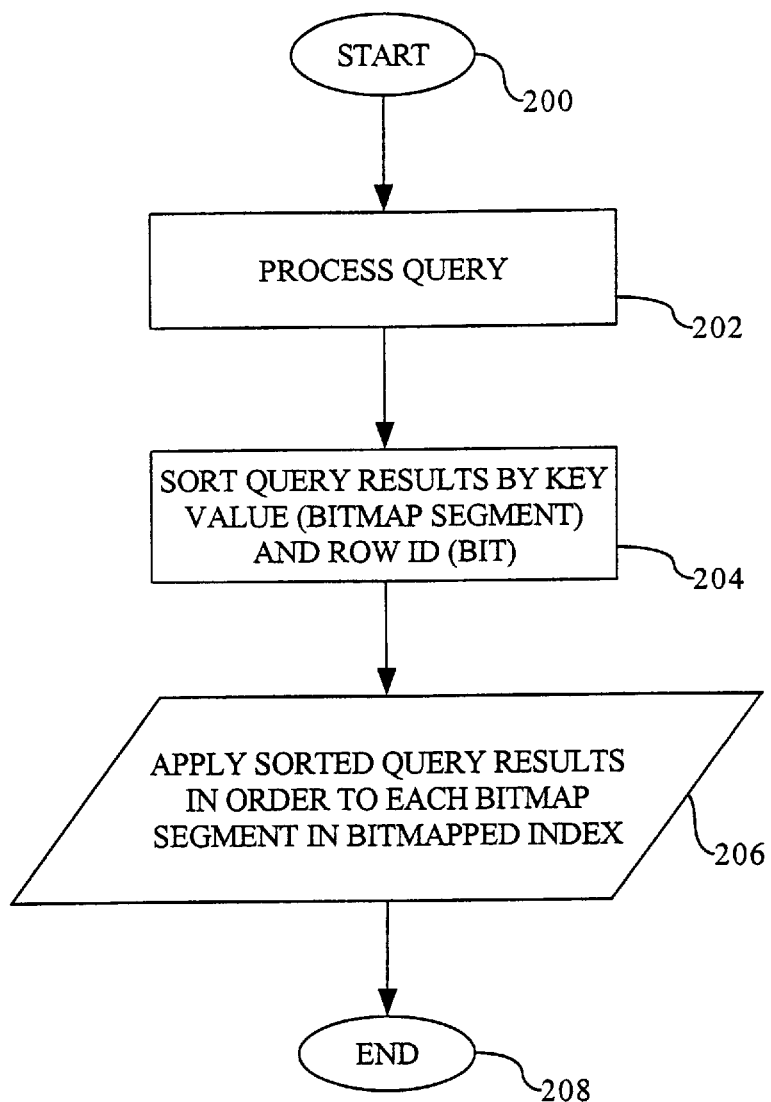
FIG. 2 illustrates a customer data table.

The present invention provides a method and apparatus for updating a bitmapped index to reflect a large number of changes made to data upon which the bitmapped index is based which reduces the resources required to update the bitmapped index. In general, the method involves (1) sorting query results associated with changes made to data upon which the bitmapped index is based, and (2) applying the sorted query results to the bitmapped index. This method is now summarized with respect to the flow chart of FIG. 2. After starting in step 200, in step 202 a database query is processed which provides query results specifying database changes by key value (bitmap segment) and row ID (bit). In step 204, the query results are sorted by key value (bitmap segment) and row ID (bit). Then, in step 206 the sorted query results are applied in order to each bitmap segment contained in the bitmapped index. Finally, in step 208 the process is complete. The specific steps involved in sorting the query results and applying the sorted query results are now described in more detail.

1. SORTING THE QUERY RESULTS

When a database query which specifies changes to a data table is processed, the results of processing the database query (query results) may be used to update any bitmapped indexes based upon the data table. Typically, query results identify the columns (data types) and rows, in the form of key values (bitmaps) and row IDs (bits), where deletions of old data and insertions of new data were performed on the data table.

Updating a bitmapped index based upon query results containing the key value (bitmaps) and row ID (bit) associated with each change is relatively straightforward when bitmapped index entries are structured by bitmap (key value) and bit (row ID). However, although query results may identify changes by key value and row ID, query results typically are not ordered by key value and row ID because the logical order of data is not necessarily related to the physical order of data on disk. This sometimes occurs when a straight table scan or when multiple bitmapped indexes are used to evaluate a database query. A notable example is when a "WHERE" clause in a database query contains multiple predicates, requiring that several columns in the data table be evaluated. Consequently, updating a segmented bitmapped index based upon the natural order of the query results requires that some bitmap segments be updated several times. Each time a bitmap segment is updated, the bitmap segment must be read into memory, updated and then written out to disk. Also, a lock and unlock operation must be performed, respectively, on the index entry containing the bitmap to be updated.

To address the inefficiencies associated with updating a bitmapped index based upon the natural order of the query results, according to an embodiment of the present invention, the query results are first sorted by key value (bitmap segment) and row ID (bit) before being applied to a bitmapped index so that when the query results are applied to a bitmapped index, all of the changes for a bitmap segment are applied at one time. Significant improvements in the efficiency of updating a bitmapped index is achieved when all of the changes for a particular bitmap segment are applied to that bitmap segment at once. This process is now described with reference to FIGS. 3 through 8.

FIG. 3 illustrates a customer data table 300 containing customer information. Each of the four columns contains a type of customer data consisting of either NAME, LOCATION, TYPE or DISCOUNT, while each row contains all of the data for a particular customer.

FIG. 4 illustrates the index entries 402 of a segmented bitmapped index 400 for the data type LOCATION of customer data table 300. Each index entry 402 corresponds to one of the four possible key values (EAST, NORTH, SOUTH, WEST) for the data type LOCATION. Furthermore, each index entry 402 includes a key, a starting row identifier (SRID), an ending row identifier (ERID) and a bitmap segment, as indicated by the column headings. The key contains one of the four possible values (EAST, NORTH, SOUTH, WEST) for the data type LOCATION. The SRID and ERID data types support segmented tables by identifying a range of rows in customer data table 300 to which a particular index entry 402 applies. Each bitmap segment contains a string of bits corresponding to the rows in customer data table 300 within the range identified by the SRID and ERID values. Each bit in a bitmap segment corresponds to a specific row in customer data table 300 and indicates whether the row contains the particular key value specified by an index entry 402. For example, the first bit 404 in the bitmap segment contained in index entry 406 of segmented bitmapped index 400 indicates that the first row SRID in customer data table 300 contains the key value EAST in the LOCATION column.

FIG. 5 illustrates the index entries 502 of a segmented bitmapped index 500 for data type TYPE of customer data table 300 which conforms to the same format as just described for segmented bitmapped index 400 for the data type LOCATION in FIG. 4.

FIG. 6 illustrates the index entries 602 of a segmented bitmapped index 600 for data type DISCOUNT which conforms to the same format as just described for segmented bitmapped index 400 for data type LOCATION in FIG. 4.

FIG. 7 is a table 700 illustrating the unsorted results of a database query "SET DISCOUNT=SPECIAL WHERE LOCATION='EAST' AND TYPE='BUSINESS'" performed on customer data table 300. Each entry 702 contains change information which includes a key value and row ID specifying either the prior key value or the new key value for a particular row in the column DISCOUNT of customer data table 300. According to an embodiment of the present invention, the key value and row ID contained in each entry 702 is used to update segmented bitmapped index 600 to reflect the changes made to customer data table 300.

For example, entry 704 specifies that the third row of customer data table 300 under the DISCOUNT column either previously contained the key value NONE or, after applying the present query, now contains the key value NONE. To make segmented bitmapped index 600 reflect this change, the third bit of bitmap segment 604 (FIG. 6) must be flipped. This involves reading bitmap segment 604 into memory, flipping the third bit from a "0" to a "1", and then writing bitmap segment 604 back to disk.

Applying the changes specified in entries 702 based upon the natural order of the query result as illustrated in FIG. 7 causes some of the bitmapped segments contained in the bitmapped index entries 602 to be updated more than once. For example, entries 704 and 708 specify changes to the third and first bits, respectively, of bitmap segment 604 for the key value NONE. However, all of the other index entries 706 specify changes to other bitmap segments contained in index 600. Therefore, applying the changes specified in entries 704, 708 in the order illustrated in FIG. 7 would require bitmap segment 604 to be updated twice. In addition to the system resources required to apply these changes, a lock and unlock operation would be performed for each update.

FIG. 8 is a table illustrating the entries 702 of FIG. 7 after being sorted alphabetically by key value and in ascending order by row ID, according to an embodiment of the present invention. Sorting entries 702 by key value and row ID groups all of the changes for a particular bitmap (key value) together in ascending order by bit (row ID). Applying in order sorted entries 702 from table 800 to bitmap segments contained in segmented bitmapped index 600 results in each bitmap segment being only updated once, which reduces the amount of system resources and lock/unlock operations required to apply the changes.

For example, applying the changes specified by entries 708, 704 in sorted order at one time to bitmap segment 604 results in the first and third bits of bitmap segment 604 being flipped in a single operation, changing bitmap segment 604 from "100" to "001". According to one embodiment of the present invention, the flipping of bits specified by a change is performed with a logical XOR operation. However, other methods of applying the updates may be used without departing from the scope of the present invention.

2. APPLYING THE SORTED QUERY RESULTS TO A BITMAPPED INDEX

Once the query results have been sorted by key value (bitmap segment) and row ID (bit), the query results are applied to the bitmapped index based upon the data on which the query was performed. As previously discussed, this involves reading a bitmap segment from a bitmapped index into memory, applying all of the changes to the bitmap segment and then writing the bitmap segment to disk. Prior to reading a bitmap segment into memory, a lock is obtained on the bitmapped index entry containing the bitmap segment so that other processes cannot access the same bitmap segment during the update. Once the bitmap segment has been written to disk, the lock is released.

For many situations, applying the sorted query results is a relatively simple process, as just described. However, in some situations, this process can be made more efficient, particularly for segmented bitmapped indexes which are compressed. Compressed segmented bitmapped indexes do not necessarily contain bitmap segments for all of the rows covered by a bitmap represented in the bitmapped index. This occurs when a data table column does not contain a particular key value for a large number of consecutive rows. To reduce the number and size of bitmap segments in the segmented bitmapped index, bitmap segments are not generated for large ranges of rows where a key value is not present. This avoids having bitmap segments which contain thousands of bits which are all "0".

For example, FIG. 9 illustrates the index entries for a compressed segmented bitmapped index 900 for the data type GENDER. Index 900 contains a group of index entries 902 for the key value FEMALE, each of which contains a bitmap segment. Each bitmap segment covers a range of rows in the data table (not illustrated) upon which index 900 is built, as identified by the SRID and ERIED columns. Index 900 is compressed because the bitmap segments contained in entries 902 do not cover all of the rows (1–600) in the data table upon which index 900 is based. Specifically, index entry 904 covers rows 101–200, while index entry 908 covers rows 400–500. Since index 900 does not contain a bitmap segment covering rows 201–399, rows 201–399 do not contain the key value FEMALE. Rather, rows 201–399 contain one of the other possible key values for GENDER, which in this case, can only be MALE.

Updating index 900 to reflect a change to row 350 to contain the key value FEMALE of the data table upon which index 900 is based requires that a new index entry 902 be generated covering at least row 350. Since none of the existing bitmap segments need to be updated, none of the existing index entries 902 will be locked. However, a locking strategy is necessary to ensure that another process does not write a new index entry 902 covering row 350. Therefore, according to an embodiment of the present invention, one of three locking strategies is employed to ensure that bitmapped index 900 is only updated by a process to which a lock has been granted. These locking strategies include, (A) the bitmap overlap locking strategy, (B) the "hole" locking strategy, and (C) the front end locking strategy, which are described hereinafter.

A. BITMAP OVERLAP LOCKING STRATEGY

The bitmap overlap locking strategy is used in the situation where the row ID of a change made to a data table, upon which a segmented bitmapped index is based, is covered by a bitmap segment contained in one of the entries of the segmented bitmapped index. According to this strategy, a lock is secured on the segmented bitmapped index entry containing the bitmap segment to be updated. Then the index is checked to ensure that no changes were made to the index while the lock was being secured which might affect the change to be applied. Then, the change is applied to the bitmap segment contained in the locked index entry followed by a release of the lock.

For example, referring to FIG. 9, if a change is made to row 150 in the data table (not illustrated) upon which index 900 is based, then a lock is obtained on index entry 904 which covers rows 101–200 in the data table. Note that securing a lock on index entry 904 implicitly locks rows 101–399 since writing a new index entry covering any of rows 201–399 would require a lock on index entry 904 according to the "hole" locking strategy discussed in more detail hereinafter. Accordingly, after securing a lock on index entry 904, index 900 is checked to ensure that no other changes have been made affecting rows 201–399. Then, the change is applied to bitmap segment 906. Once bitmap segment 906 has been updated and written to disk, the lock on index entry 904 is released. If, for any reason, a lock cannot be secured on index entry 904 or a change was made to index 900 affecting rows 201–399, then the update is not applied to bitmap segment 906, and the test to determine the appropriate locking strategy is repeated.

B. "HOLE" LOCKING STRATEGY

The "hole" locking strategy is used when the row ID of a change made to a data table upon which a segmented bitmapped index is based requires that a new index entry be created because the row ID of the change falls between the row IDs (in a "hole") covered by the existing bitmap segments in the segmented bitmapped index. Generally, the hole locking strategy involves securing a lock on the index entry immediately preceding the hole. The preceding entry usually covers row IDs less than the row ID of the change for the same key value. When it does not, then the preceding index entry is the last index entry for the prior key value. Note that under the hole locking strategy, locking an index entry implicitly locks all of the rows between the index entry locked and the next index entry (the "hole"), even for a different key value, since any other process attempting to write a new index entry covering any of the rows in the hole would be required to secure a lock on the same index entry.

For example, suppose the value under the GENDER column of row 350 of the table (not illustrated) upon which segmented bitmapped index 900 is based is changed to FEMALE, which requires that a new index entry covering at least row 350 be generated and stored in index 900. Note that row 350 is not covered by any index entries in index 900 and is in the hole between the rows covered by index entry 904 and index entry 908. According to the hole locking strategy, before the new index entry is stored in index 900, a lock is secured on index entry 904, since index entry 904 covers rows 101–200, which are closest to, but less than, row 350. After the lock is secured, index 900 is checked to ensure that another process hasn't made an update to index 900 affecting any rows 201–399 for the key value FEMALE. If so, then the new index entry is not written to index 900 and the test to determine the appropriate locking strategy is repeated. Otherwise, the new index entry is stored in index 900 and then the lock on entry 904 released. When consistently employed, the hole locking strategy prevents another process from making an update to index 900 affecting any row in the range of 201–399.

As another example, suppose the value under the GENDER column of row 5 is changed to MALE, which requires that a new index entry covering at least row 5 be generated and stored in index 900. Since index 900 does not contain an entry for the key value MALE covering a row less than 5, then a lock is obtained on entry 910, which is the last index entry for the key value FEMALE. Note that locking entry 910 implicitly locks all rows between row number 501 for the key value FEMALE and row number 9 for the key value MALE because, under the hole locking strategy, any other process attempting to write a new index entry covering any of these rows would require a lock on index entry 910.

C. FRONT END LOCKING STRATEGY

The front end locking strategy is used when a change made to a data table upon which a segmented bitmapped index is based requires that a new index entry be added to the beginning of the segmented bitmapped index. Since the index does not contain an index entry preceding the location of the new index entry, the hole locking strategy cannot be used. Instead, according to the front end locking strategy, before the new index entry is stored in the segmented bitmapped index, a dummy index entry is generated and stored as the first entry in the segmented bitmapped index. Then, a lock is secured on the dummy index entry which effectively locks the beginning of the index up to the first index entry after the dummy index entry. After a lock is secured on the dummy index entry, the segmented bitmapped index is checked again to ensure that the new index entry will be the first entry in the index. This ensures that another process didn't write a new entry into the beginning of the index before the lock was secured. If so, then the new index entry is stored in the segmented bitmapped index. This locking strategy prevents another process from also writing a new index entry to the segmented bitmapped index covering a row less than the lowest row covered by the bitmapped index for that value. On the other hand, if, while the lock on the dummy index was being secured, another process wrote a new index entry into the first position in the index, then the new index entry is not written into the index and the test to determine the appropriate locking strategy is repeated.

Referring again to FIG. 9, consider an example which specifies a change to row 5 of the data table upon which segmented bitmapped index 900 is based such that row 5 now contains the key value FEMALE. A new index entry covering at least row 5 must be generated and stored in index 900. Since index 900 does not contain an entry covering rows 1–4, a dummy index entry is generated and stored in index 900 as the first entry. A lock is then secured on the dummy entry and the index checked to ensure that another entry covering any of rows 1–4 has been written to index 900. Then, the new entry covering row 5 is written to index 900, the lock on the dummy entry released, and the dummy entry deleted. This strategy prevents another process from storing a new index entry 902 covering rows 1–9 in the data table upon which index 900 is based.

Figure 10A:
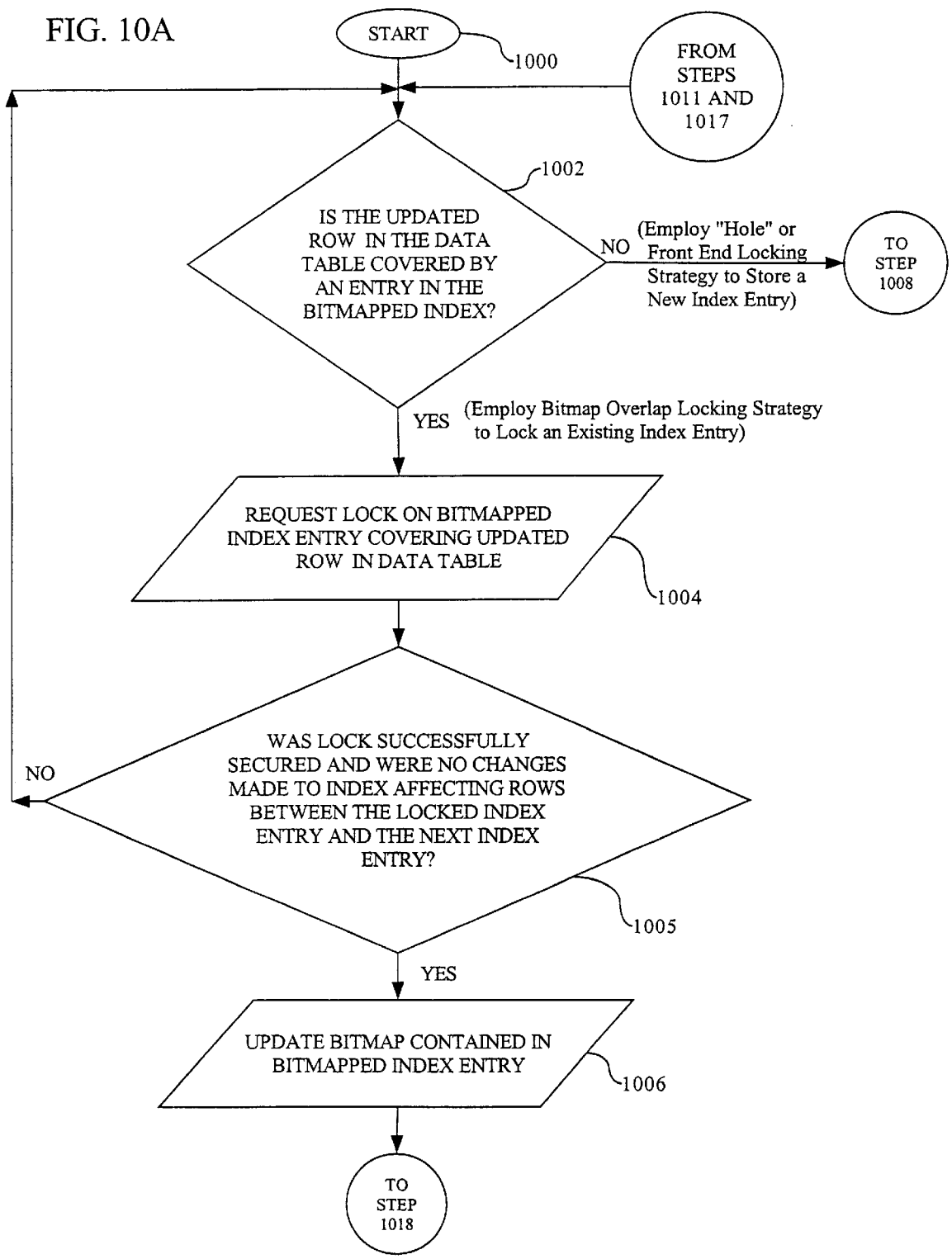
FIGS. 10A, 10B and 10C comprise a flow chart illustrating a method for applying sorted query results to a bitmap contained in a bitmapped index to reflect changes made to data upon which the bitmapped index is based, according to an embodiment of the present invention.
Figure 10B:
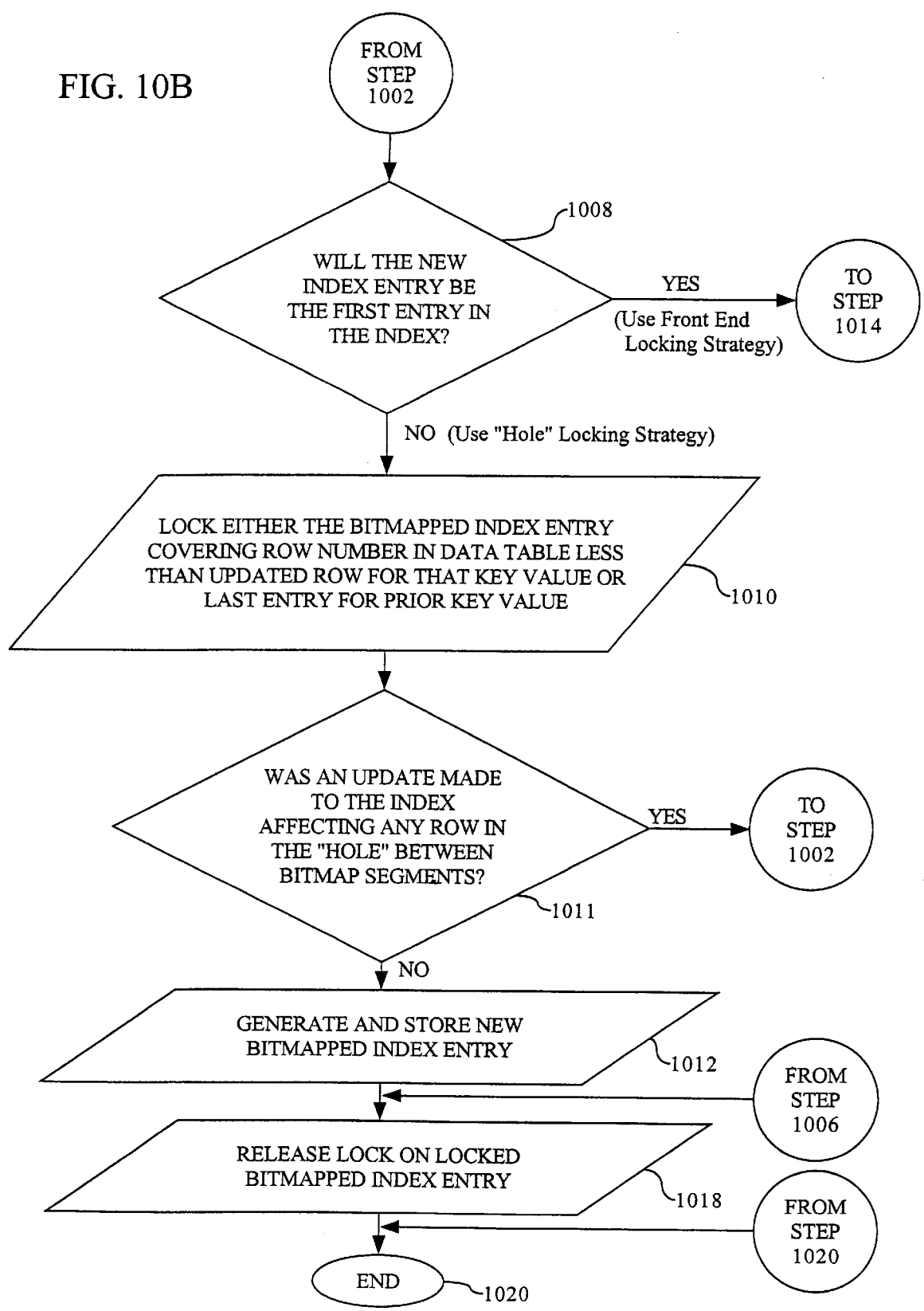
Figure 10C:
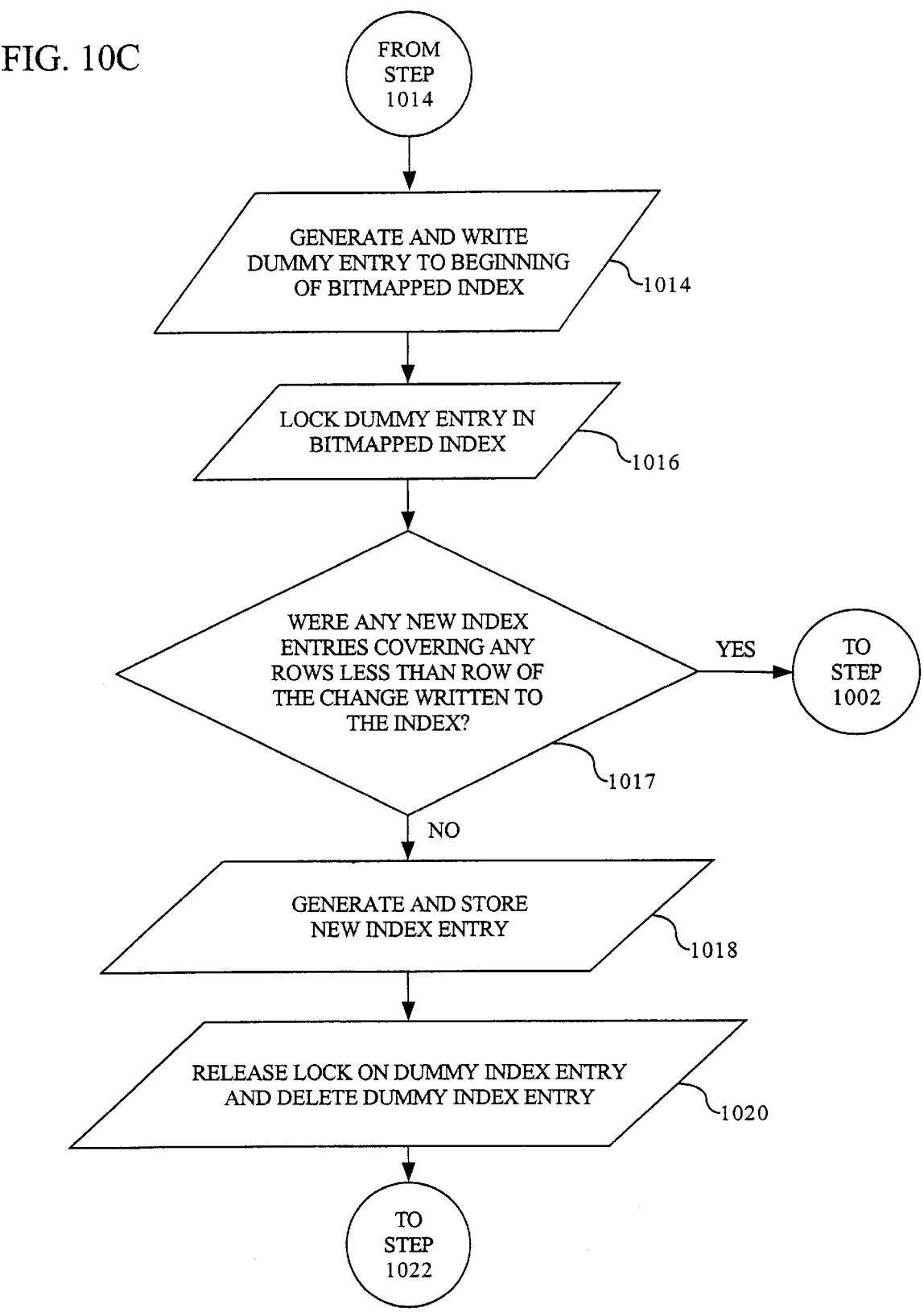

The method for updating a bitmap represented in a bitmapped index to reflect a change made to a data table upon which the bitmapped index is based according to an embodiment of the present invention is now described with reference to the flow chart of FIGS. 10A, 10B and 10C.

After starting in step 1000, in step 1002 a determination is made as to whether the updated row in the data table is covered by an entry in the bitmapped index. If the updated row in the data table is covered by an entry in the bitmapped index then, according to the bitmap overlap locking strategy, in step 1004 a lock is requested on the bitmapped index entry covering the updated row in the data table. In step 1005 a determination is made as to whether a lock was successfully secured on the bitmapped index entry covering the updated row in the data table and whether any changes were made to the index affecting the rows between the locked index entry and the next index entry in the index. If a lock could not be successfully secured or a change was made to the index affecting the rows between the locked index entry and the next index entry in the index, then the update cannot currently be made and step 1002 is repeated to determine which locking strategy is to be applied. One reason why a lock may not be successfully secured is that another process may have deleted the index entry to be updated. If, however, in step 1005 the lock was successfully secured and no changes were made to the index affecting the rows between the locked index entry and the next index entry, then in step 1006 the bitmap contained in the bitmapped index entry is updated.

If in step 1002 the updated row in the data table is not covered by an entry in the bitmapped index, then a new bitmapped index entry must be generated and stored in the bitmapped index according to either the "hole" locking strategy or the front end locking strategy.

To determine whether the "hole" locking strategy or the front end locking strategy is to be employed, in step 1008 a determination is made as to whether the new bitmapped index entry will be the first entry in the segmented bitmapped index. If not, then the "hole" locking strategy is employed and in step 1010 a lock is secured on the bitmapped index entry preceding the hole, that is, the index entry covering a row in the data table less than the row which was updated for that key value. If, however, the new index entry will be the first entry in the index for that key value, then a lock is secured on the last index entry for the prior key value. Then, in step 1011, a determination is made as to whether an update was made to the index affecting any of the rows in the "hole" between existing bitmap segments. If so, the change may no longer be in a "hole" between bitmap segments and consequently the process returns to step 1002 to reevaluate the locking strategy to be employed. If not, then in step 1012 a new bitmapped index entry is generated and stored in the bitmapped index covering the updated row.

Returning to step 1008, if the bitmapped index does not contain an entry covering a row in the data table less than the row which was updated, then the front end locking strategy is used. According to the front end locking strategy, in step 1014 a dummy entry is generated and stored in the beginning of the bitmapped index. Then, in step 1016, a lock is secured on the dummy index entry. Locking the dummy index entry implicitly locks the entire beginning of the index up to the first index entry after the dummy index entry. In step 1017, a determination is made as to whether a new index entry was written to the index covering any of these implicitly locked rows. If so, then the new index entry may not be the first entry in the index and the front end locking strategy cannot be used. Therefore, the process returns to step 1002 to reevaluate the locking strategy to be employed. Otherwise, in step 1018 a new index entry covering the updated rows is generated and stored in the beginning of the bitmapped index. Then, in step 1020 the lock is released on the dummy index entry and the dummy index entry is deleted. Then, in step 1022, the process is completed.

The present invention provides several advantages over prior approaches for updating bitmapped indexes to reflect a large number of changes to data upon which the bitmapped indexes are based. First, the sorting of query results by key value and row ID allows all changes to be applied to a bitmap segment at once, reducing the system resources required to update the bitmapped index. In addition, the sorting of the query information by key value and row ID results in sequential or skip-sequential disk I/O which enhances performance compared to random disk I/O. In addition, the range locking approach minimizes the lock resources required to update the bitmapped indexes to reflect the changes upon which the bitmapped indexes are based.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method for updating a bitmapped index to reflect a change made to data upon which the bitmapped index is based, the method comprising the steps of:
   (a) sorting by key value and row ID a plurality of change records that reflect the change made to the data, the key value and row ID identifying bitmap segments contained in the bitmapped index to be updated, the plurality of change records reflecting the change made to the data, the plurality of change records further corresponding to the bitmap represented in the bitmapped index; and
   (b) applying in order the sorted plurality of change records to the bitmap represented in the bitmapped index by
      (i) locking a bitmapped index entry containing a bitmap segment corresponding to the change made to data;
      (ii) flipping a bitmap bit in the bitmapped index specified by the key value and row ID contained in the sorted plurality of change records; and
      (iii) unlocking the locked bitmapped index entry.

2. The method of claim 1, further comprising the step of if the bitmapped index does not contain an entry with a bitmap segment corresponding to the changed data, then performing the steps of
   a) determining whether the bitmapped index contains an entry with a bitmap segment corresponding to a row number in the changed data which is less than a row number of the change,
   b) if the bitmapped index contains an entry with a bitmap segment preceding the key and row number in the changed data, then locking the preceding index entry, and
   c) if the bitmapped index does not contain an entry preceding the key and row number to be changed,
      i) creating a dummy bitmapped index entry,
      ii) storing the dummy bitmapped index entry in the bitmapped index, and
      iii) locking the dummy bitmapped index entry.

3. A method for updating a bitmapped index to reflect a change made to data upon which the bitmapped index is based, the method comprising the steps of:
   sorting a plurality of change records based upon a bitmap represented in the bitmapped index, the plurality of change records reflecting the change made to the data, the plurality of change records further corresponding to the bitmap represented in the bitmapped index; and
   applying in order the sorted plurality of change records to the bitmap represented in the bitmapped index.

4. The method of claim 3, further comprising the step of sorting the plurality of change records based upon bits contained in the bitmap represented in the bitmapped index, each bit corresponding to the location of the change made to the data.

5. The method of claim 3, wherein the step of sorting the plurality of change records based upon a bitmap represented in the bitmapped index further comprises the step of sorting the plurality of change records based upon key values and row IDs, the key values and row IDs identifying bitmap segments contained in the bitmapped index to be updated.

6. The method of claim 5, wherein the step of applying in order the sorted plurality of change records to the bitmap represented in the bitmapped index further comprises the step of flipping a bitmap bit in the bitmapped index specified by the key value and row ID contained in the sorted plurality of change records.

7. The method of claim 3, wherein the step of applying in order the sorted plurality of change records to the bitmap represented in the bitmapped index further comprises the step of applying in order the sorted plurality of change records to bitmap segments contained in the bitmapped index and wherein the method further comprises the steps of
   locking a bitmapped index entry containing a bitmap segment corresponding to the change made to data, and
   unlocking the locked bitmapped index entry.

8. The method of claim 7, further comprising the step of if the bitmapped index does not contain an entry with a bitmap segment corresponding to the changed data, then performing the steps of
   determining whether the bitmapped index contains an entry with a bitmap segment corresponding to a row number in the changed data which is less than a row number of the change,
   if the bitmapped index contains an entry with a bitmap segment corresponding to a row number in the changed data which is less than the row number of the change, then locking the bitmapped index entry with a bitmap corresponding to a row number in the changed data which is less than the row number of the change, and if the bitmapped index does not contain an entry with a bitmap segment corresponding to a row number in the changed data which is less than the row number of the change,
  i) creating a dummy bitmapped index entry,
  ii) storing the dummy bitmapped index entry in the bitmapped index, and
  iii) locking the dummy bitmapped index entry.

9. A computer-readable medium carrying one or more sequences of one or more instructions, the one or more sequences of one or more instructions including instructions which, when executed by one or more processors, cause the one or more processors to perform the steps of:
  sorting a plurality of change records based upon a bitmap represented in the bitmapped index, the plurality of change records reflecting the change made to the data, the plurality of change records further corresponding to the bitmap represented in the bitmapped index; and
  applying in order the sorted plurality of change records to the bitmap represented in the bitmapped index.

10. The computer-readable medium of claim 9, wherein the computer-readable medium further includes instructions for sorting the plurality of change records based upon bits contained in the bitmap represented in the bitmapped index, each bit corresponding to the location of the change made to the data.

11. The computer-readable medium of claim 9, wherein the instructions for sorting the plurality of change records based upon a bitmap represented in the bitmapped index further include instructions for sorting the plurality of change records based upon a key value and a row ID, the key value and the row ID identifying bitmap segments contained in the bitmapped index to be updated.

12. The computer-readable medium of claim 11, wherein the instructions for applying in order the sorted plurality of change records to the bitmap represented in the bitmapped index further include instructions for flipping a bitmap bit in the bitmapped index specified by the key value and row ID contained in the sorted plurality of change records.

13. The computer-readable medium of claim 9, wherein the instructions for applying in order the sorted plurality of change records to the bitmap represented in the bitmapped index further include instructions for applying in order the sorted plurality of change records to bitmap segments contained in the bitmapped index and wherein the computer-readable medium further includes instructions for
  a) locking a bitmapped index entry containing a bitmap segment corresponding to the change made to data, and
  b) unlocking the locked bitmapped index entry.

14. The computer-readable medium of claim 13, wherein the instructions for applying in order the sorted plurality of change records to the bitmap represented in the bitmapped index further include instructions for if the bitmapped index does not contain an entry with a bitmap segment corresponding to the changed data, then performing the steps of
  a) determining whether the bitmapped index contains an entry with a bitmap segment corresponding to a row number in the changed data which is less than a row number of the change,
  b) if the bitmapped index contains an entry with a bitmap segment corresponding to a row number in the changed data which is less than the row number of the change, then locking the bitmapped index entry with a bitmap corresponding to a row number in the changed data which is less than the row number of the change, and
  c) if the bitmapped index does not contain an entry with a bitmap segment corresponding to a row number in the changed data which is less than the row number of the change,
    i) creating a dummy bitmapped index entry,
    ii) storing the dummy bitmapped index entry in the bitmapped index, and
    iii) locking the dummy bitmapped index entry.

15. A method for updating a segmented bitmapped index to reflect a change made to data upon which the segmented bitmapped index is based, the method comprising the steps of:
  receiving a plurality of change records specifying changes to bitmap segments contained in the segmented bitmapped index;
  sorting the plurality of change records based upon the order of the bitmap segments contained in the segmented bitmapped index to generate a sorted plurality of change records; and
  applying in order the sorted plurality of change records to the bitmap segments contained in the segmented bitmapped index.

16. The method of claim 15, wherein the plurality of change records further specify changes to bits in the bitmap segments and wherein the method further comprises the step of sorting the plurality of change records based upon the bits in the bitmap segments contained in the segmented bitmapped index.

17. The method of claim 15, wherein the plurality of change records specify key values and row IDs and wherein the step of sorting the plurality of change records based upon the order of bitmap segments contained in the segmented bitmapped index further comprises the step of sorting the plurality of change records based upon key value and row ID.

18. The method of claim 15, wherein the step of applying in order the sorted plurality of change records to the segmented bitmapped index further comprises the steps of
  selecting one of the plurality of change records;
  determining whether the selected change record specifies a change to a bitmapped segment contained in the bitmapped index;
  if the selected change record specifies a change to a bitmap segment contained in the segmented bitmapped index, then performing the steps of
    i) locking a bitmapped index entry containing the bitmap segment specified by the selected change record,
    ii) flipping a bit in the bitmap segment contained in the locked bitmapped index entry specified by the selected change record, and
    iii) unlocking the locked bitmapped index entry.

19. The method of claim 18, further comprising the step of if the selected change record does not specify a change to a bitmap segment contained in the segmented bitmapped index, then performing the steps of
  i) determining whether the bitmapped index contains a bitmap segment corresponding to a row in the change made to data having a row ID less than the row ID of the change,
  ii) if the bitmapped index contains a bitmap segment corresponding to a row in the changed data having a row ID less than the row ID of the change, then performing the steps of locking the bitmapped index entry containing the bitmap segment corresponding to a row in the changed data having a row ID less than the row ID of the change, generating a new bitmapped index entry reflecting the change contained in the selected change record, and unlocking the bitmapped index entry containing the bitmap segment corresponding to a row in the changed data having a row ID less than the row ID of the change, and iii) if the bitmapped index does not contain a bitmap segment corresponding to a row in the changed data having a row ID less than the row ID of the change, then performing the steps of creating a dummy bitmapped index entry, storing the dummy bitmapped index entry in the bitmapped index, locking the dummy bitmapped index entry, generating a new bitmapped index entry reflecting the change contained in the selected change record, and unlocking the dummy bitmapped index entry.

20. A computer system for updating a bitmapped index to reflect a change made to data upon which the bitmapped index is based, the computer system comprising:

one or more processors; and a memory coupled to the one or more processors, the memory comprising:

a) a first set of data of a first type, the first set of data specifying a bitmap segment contained in the bitmapped index to be updated; and b) a second set of data of a second type, the second set of data specifying a change to the bitmap segment specified by the first set of data, which, when applied to the bitmap segment, causes the bitmapped index to reflect a change made to data upon which the bitmapped index is based.

21. The computer system of claim 20, wherein the bitmapped index is a segmented bitmapped index built upon a key and wherein the first set of data further specifies a key value associated with a bitmap segment contained in the segmented bitmapped index to be updated, and wherein the second set of data specifies a row ID corresponding to both a row in the data upon which the segmented bitmapped index is based and a bit in the bitmap segment specified by the first set of data which when flipped, causes the segmented bitmapped index to reflect the change made to the data upon which the segmented bitmapped index is based.

* * * * *